Aug. 10, 1954　　　　A. E. MacNEILL　　　　2,686,154
DIALYSIS APPARATUS
Filed May 24, 1950　　　　　　　　　　　　　5 Sheets-Sheet 1
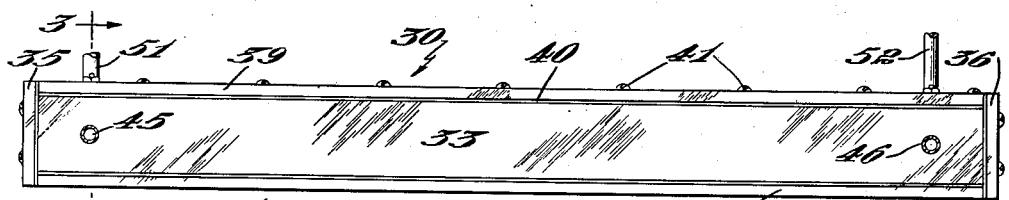
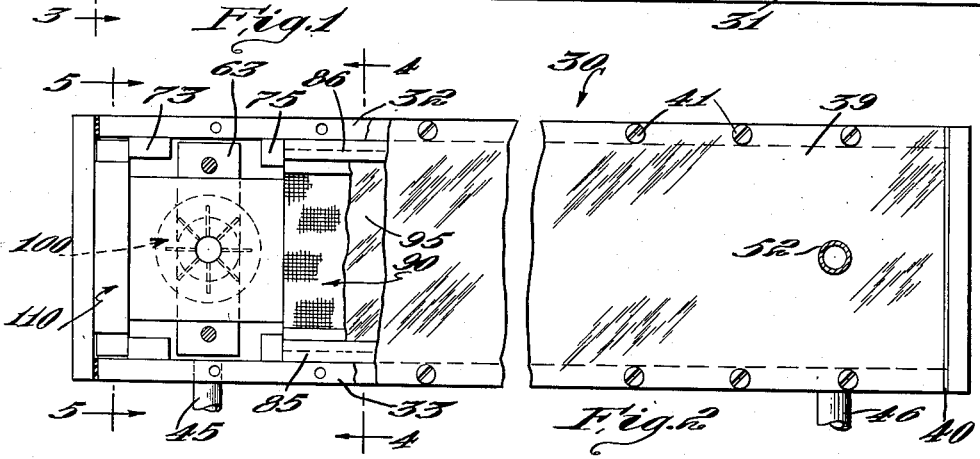
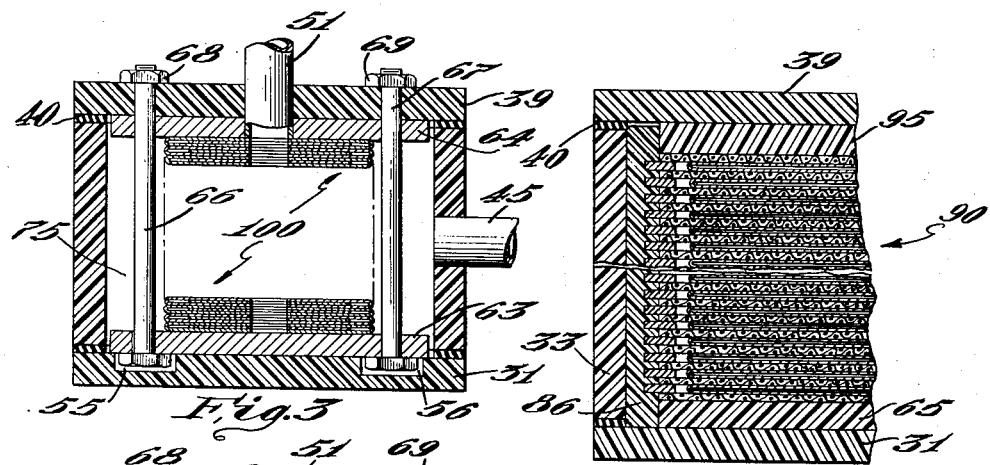
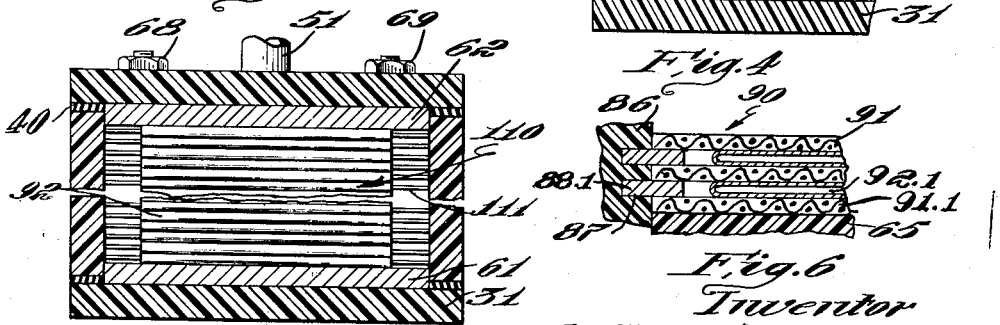
Inventor
Arthur E. MacNeill
by Roberts, Cushman & Grover
Att'ys.

Aug. 10, 1954　　　A. E. MacNEILL　　　2,686,154
DIALYSIS APPARATUS
Filed May 24, 1950　　　　　　　　　　5 Sheets-Sheet 2
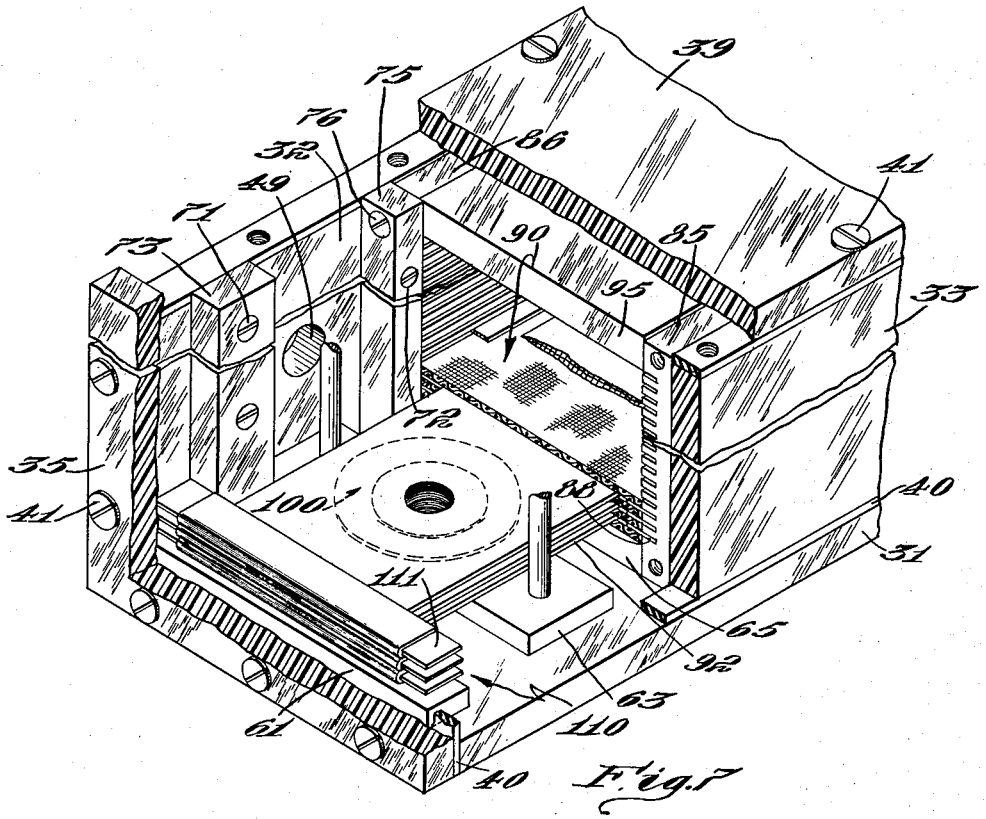
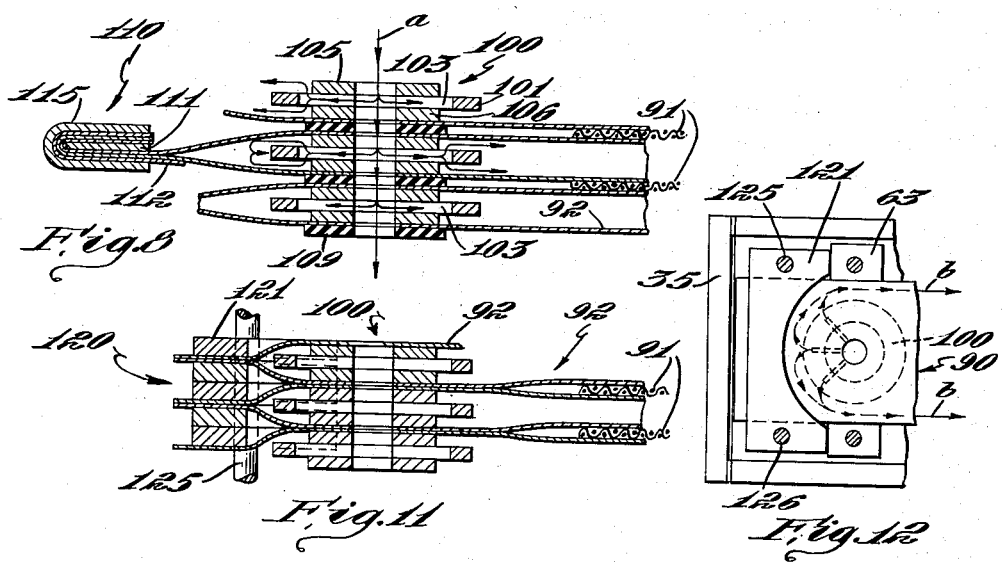
Inventor
Arthur E. MacNeill
by Roberts, Cushman & Grover
Att'ys.

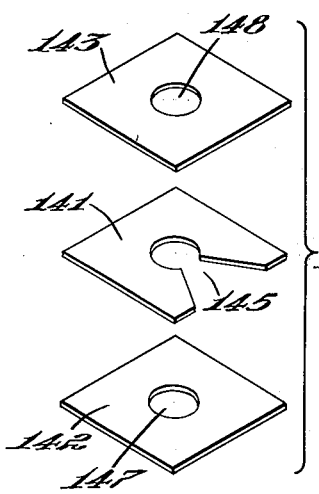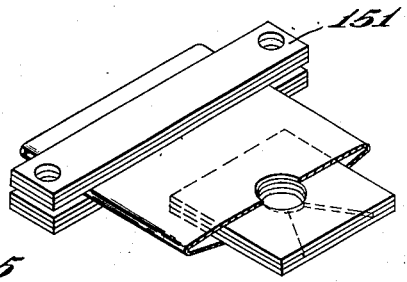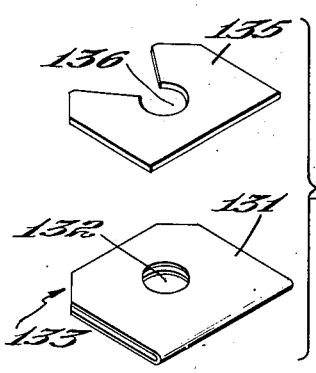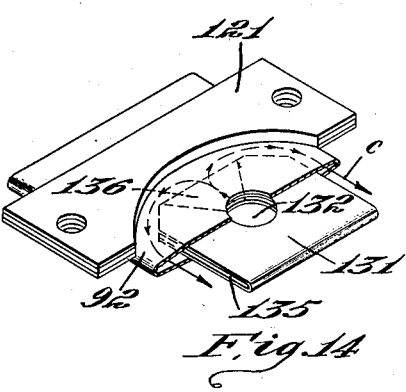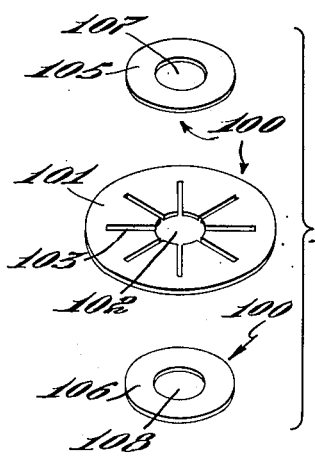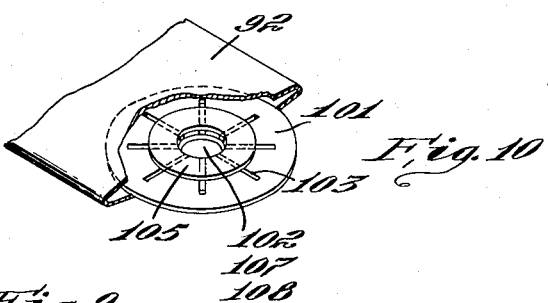

Aug. 10, 1954 A. E. MacNEILL 2,686,154
DIALYSIS APPARATUS
Filed May 24, 1950 5 Sheets-Sheet 4

Inventor
Arthur E. MacNeill
by Roberts, Cushman & Grover
Att'ys.

Aug. 10, 1954        A. E. MacNEILL              2,686,154
                     DIALYSIS APPARATUS
Filed May 24, 1950                           5 Sheets-Sheet 5

Inventor
Arthur E. MacNeill
by Roberts, Cushman + Grover
Att'ys.

UNITED STATES PATENT OFFICE 2,686,154

DIALYSIS APPARATUS

Arthur E. MacNeill, Hanover, N. H.

Application May 24, 1950, Serial No. 163,849

12 Claims. (Cl. 210—8.5)

This invention relates to apparatus employing pliable fluid conduits and, while useful for other purposes such as commercial fluid extraction, or heat exchange, is particularly applicable to apparatus for exchange of fluid constituents such as in the clinical treatment of blood or other liquids temporarily deviated or removed from the body of a patient or transferred from a donor.

One of the main objects of my invention is to provide apparatus of this type which is comparatively small and compact while providing a volume-surface ratio which is favorable for the above indicated exchange purposes; the parts of which can be readily assembled and fabricated comparatively easily of material particularly suitable for biochemical, especially also medical purposes; which can be easily cleaned; which has throughout a conduit configuration that avoids formation of stagnant areas but promotes smooth flow which does not interfere with the physical or chemical make up of the fluid; which permits the treatment of very small volumes of fluid; the effective exchange area, exchange medium, and exchange area to fluid volume ratio of which can be not only exactly predetermined but also easily modified without major structural changes; which permits operation with very thin smoothly moving fluid bodies the thickness of which can be easily modified; which withstands considerable pressure differences; which promotes economical use of treating such as washing, fluid; which permits exact control and metering of the fluid supply; and which is easily adaptable to various quite dissimilar modes of operation.

Another important object is to provide a header construction for apparatus of the above type which is particularly efficient for medical and generally biological purposes, is very adaptable and yet comparatively simple and inexpensive.

A specific, typically characteristic object of this invention is to provide apparatus which in cases of acute renal failure artificially maintains homeostasis of the blood by dialyzing the blood temporarily removed or deviated in an external circuit, from the patient's body. To further this and analogous objects the apparatus should have a maximum semipermeable membrane area with a minimum volume so that the amount of blood removed from the patient at any time is minimized. It is also important that the passageways through which the blood flows be constructed to eliminate stagnation areas wherein the blood flow tends to slow, thereby increasing risk of clotting. A further object in this particular field is to provide apparatus which, in addition to maintaining homeostasis of the blood, can be readily adapted to other clinical problems such as the removal of anaesthetic and other pharmacodynamic substances, and to biological problems generally, such as the selective removal of intermediate metabolites and trace substances from the living subject.

In one of its broader aspects my invention promotes the accomplishment of such objects with apparatus wherein a pliable tube, for example of semipermeable material such as cellophane, forming a conduit for a fluid and having at least one opening in its wall is equipped with restraining means, such as screens of inert material, for flattening it to essentially predetermined wall distances for the purpose of increasing and controlling the area-volume ratio of the effective tube confining surface. The tube is further combined with a header or headers including a distributor which extends within the tube, has an aperture aligned with the above-mentioned wall opening and a channel extending between the aperture and the inside of the tube. This header construction may itself seal the tube walls between the distributors or between separate elements and distributors, or a separate sealing means may be provided. This latter construction is preferred when the distributor is smaller than the tube width so that the fluid can pass between the short tube wall portion and the distributor side. This tube, flattening means and header assembly is usually confined within a fairly close fitting housing or casing with feeders that are connected to the headers. The housing itself may have fluid supply connections. The above-mentioned restraining means may be reticulated spacers such as a screen or a plate having recessed or serrated surfaces passing the fluid which is to be brought into combined action with the fluid within the tube or tubes. The relation between the cross sectional areas of tubes and tube interstices, as well as the shape and hence the above-mentioned ratio can be determined by the thickness and width of the spacers. The effective capacity of the device as a whole can be controlled by paralleling two or more tubes by interconnecting the distributors, and it is easy to connect all tubes in series or in series parallel, by subdividing the headers.

In another very important aspect of the invention, the above-mentioned header and distributor construction may be used for apparatus of any type which requires fluid supply into the interior of a space formed by pliable walls or membranes; according to the invention this is accomplished by means of the above-mentioned distributor members positioned between two walls with apertures aligned with corresponding wall openings to connect with means leading to a fluid supply; the above-mentioned channels or passageways lead from the aperture into the space between the walls and may be used as restricting or metering ports, serving for feeding as well as for withdrawing fluid. The channel may be pointed towards the sealed side of the space so that the entering or withdrawing fluid has to pass around the distributor.

Other important features of the invention are peculiar constructions of the above-mentioned distributor, depending upon the purpose at hand. In one important embodiment, the distributor consists of a larger middle washer and two smaller side washers, all three washers having central apertures, but the middle washer having radial saw cuts leading from its aperture toward its periphery, somewhat beyond the periphery of the side washers. Thus fluid can pass between the outer ends of the saw cuts and hence the inside of the tube which contacts the outer washers, and the apertures. In another embodiment, three apertured washers are stacked, the middle washer having a notch leading from the aperture towards the periphery and providing the above-mentioned channel; the two outer washers may be integral with each other being shaped similar to a folded sheet. In still another embodiment the distributor may consist of two leaves with aligned central apertures, one or both leaves having grooves running from the aperture to an edge or edges thus providing channels when the leaves are pressurably superimposed. All above-mentioned channels may vary in diameter and number as well as directions, so that the fluid can be directed and metered at will, with the flow either directly into the tubes or towards the sealed ends with flow around the distributors into the tube proper, or vice versa at a discharging point.

Still another embodiment of the header structure features a plurality of stacked washers with their apertures maintained in alignment by means of a hub or boss extending from one side of the washer to engage a recess in the opposite side of the adjacent washer. Each washer is enclosed in a respective tube with its hub projecting through an opening in one of the tube walls. A second aperture is cut in the opposite tube wall to accommodate the hub of the adjacent washer engaging the hub of the first washer within the first mentioned tube. Each washer has a channel or passageway extending in its body between the central aperture and the inside of the tube, for transferring fluid between aperture and tube. Leakage is prevented by annular rings of yieldable material, surrounding respective hubs and interposed between the walls of adjacent tubes. The stack of washers is restrained in alignment by clamping means which compresses the stack of washers, deforming the annular rings and bringing the faces of bosses and hubs into sealing contact.

Other aspects and features of my invention, in addition to those contained in the above statement of the nature and substance thereof including some of its objects, will appear from the herein presented exposition of its basic principles and the following description of several typical embodiments illustrating its novel characteristics as defined in the appended claims. This description refers to drawings in which Fig. 1 is a side elevation of a parallel flow dialyzer apparatus according to the invention;

Fig. 2 is a top view of the device according to Fig. 1 with part of the cover and the separator top removed;

Fig. 3 is a section on line 3—3 of Fig. 1;

Fig. 4 is a section on line 4—4 of Fig. 2;

Fig. 5 is a section on line 5—5 of Fig. 2;

Fig. 6 is a fragmentary detail section showing the separator construction of Fig. 4;

Fig. 7 is an axonometric view of the end of a device according to Fig. 1, with various components removed and sections respectively to show the construction;

Fig. 8 is a longitudinal detail section through distributors and sealing clamps of Fig. 7;

Fig. 9 is an exploded axonometric view of one distributor embodiment such as shown in Figs. 7 and 8;

Fig. 10 is an axonometric assembly showing the distributor according to Fig. 9 inserted within a tube;

Fig. 11 is a detail section similar to Fig. 8 but showing a different sealing device;

Fig. 12 is a fragmentary top view of an arrangement according to Fig. 11;

Fig. 13 is an exploded axonometric view of a second distributor embodiment;

Fig. 14 is an assembly view, similar to Fig. 10 of the distributor of Fig. 13, with a sealing arrangement similar to that of Fig. 12;

Fig. 15 is an axonometric view similar to those in Figs. 9 and 13 of a third distributor arrangement;

Fig. 16 is a detail assembly of the distributor construction according to Fig. 15;

Figure 17:
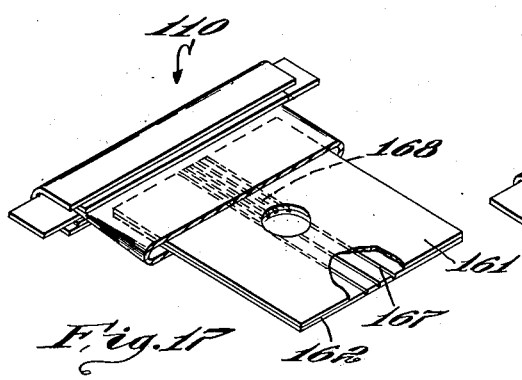
Figs. 17 and 18 show a fourth distributor construction.

Figs. 1 and 2 show an exchange device according to the invention in its main outline, with housing 30 having bottom 31, sidewalls 32 and 33, end walls 35 and 36, and cover 39. These parts may be made of any material which is substantially inert to the fluid or fluids to be handled; a transparent acrylic resin such as available under the designation "Plexiglass II (boil-proof)" was found suitable for the purpose. The walls are suitably fastened together for example with screws 41. Although smoothly polished wall surfaces provide sufficiently tight seals for many fluids encountered, sealing gaskets or strips as shown at 40 can be introduced if desired. In the embodiment shown, silicone rubber covered glass cloth gaskets .01″ thick were found to be satisfactory. The supply tubes 45, 46 for the housing proper may lead into any one of the walls, compare Figs. 1, 2, 3 and 7.

Through a wall having a certain relationship to the interior equipment of the device leads a second pair of supply tubes 51, 52 (Figs. 1 and 3) for connection with the exchange conduits in a manner presently to be described, such tubes leading for example through the cover 39. The bottom wall of the container has several recesses such as indicated at 55, 56 of Fig. 3 for the heads of bolts to be described below.

On the bottom wall 31 rest, at each end of the container, seal supporting blocks 61 (Figs. 5 and 7) and distributor supporting blocks 63 (Figs. 2, 3 and 7), and therebetween a conduit supporting plate 65 which is preferably but not necessarily screwed to bottom 31 (Figs. 4 and 7). The container has further at each end seal retaining blocks or strips 73 (Figs. 2, 3 and 7) screwed to the side walls at 71, and separator retaining strips 75 screwed at 72 to the side walls (Figs. 2 and 7).

Stacked on plate 65 and on strips 63, 61 are the exchanger battery 90 of separators 81 and conduits 82, a distributor assembly 100, and seals 110, respectively, as follows.

Along the side walls 32 and 33 are arranged, screwed at 76 to the above-mentioned strips 75, spacer plates 85, 86 (Figs. 2, 4 and 7) with saw cuts 87 (Fig. 6) into which are inserted separator leaves 88. As shown in Figs. 4, 6 and 7, a separator such as a screen 91.1 of stainless steel rests on the bottom plate 65 and is held by the first leaf 88.1. Then follows the first conduit 92.1, for example a tube of semipermeable material such as cellophane. Stacked thereon follow additional separating screens 91 held between respective leaves, and tubes 92 (Fig. 9) and so on until the conduit top plate 95 is reached. This top plate 95, and the exchanger battery 90 fit snugly between bottom 31 and cover 39; it will be noted that plate 65 and the first separator screen are held between bottom 31 and the first pair of leaves 88 (Fig. 6), whereas plate 95 and the top separator are similarly confined between the top leaves and cover 39. Plate 95 is preferably but not necessarily screwed to top 39.

At each end of the exchanger battery 90 is a distributor assembly 100 (Figs. 2, 7, 8 and 9) which will now be described in detail.

Various types of distributors can be employed with my exchange device, but that to be described first was found particularly suitable for many purposes. As indicated in Figs. 8 to 10, this assembly consists of a large disc 101 with a central aperture 102 and radial saw cuts 103. Each disc 101 is flanked by two smaller discs 105 and 106 with central apertures 107 and 108. Between respective exchanger tubes 92 may be inserted spacer washers 109 of the shape of distributor washers 105, 106 (Fig. 8). As indicated in Figs. 8 and 10, the three discs when superimposed provide a central aperture 102, 107, 108 with radial channels 103, adapted to conduct a fluid entering through the aperture through the channels to the tubes as indicated with arrows $a$ in Fig. 8, or vice versa from the tubes through the channels into the aperture.

The conduits with their distributors are firmly pressed together by means of block 63, above described, a top block 64, and two bolts 66 and 67, the heads of which are in the above mentioned recesses 55, 56 of bottom plate 31, whereas the ends protrude through the cover plate 39 and permit tightening of the distributor assembly from the outside, by means of nuts 68, 69.

Figure 21:
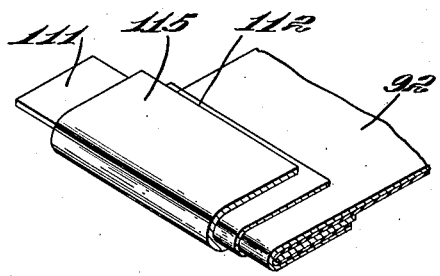
Fig. 21 is an axonometric detail view of the sealing construction according to Fig. 8.

The ends of the conduits 92 are sealed at 110 as follows. As shown in Figs. 8 and 21 the ends of the conduit tubes are folded over a steel strip 111, a protective paper or plastic sheet 112 is applied, and a steel clip 115 is slipped over the sheet 112 and forcibly contacted with the assembly by means of a simple plier like tool, thus perfecting a tight seal. The seal assembly 110 rests between the above mentioned block 61 and a top plate 62, as shown in Fig. 5. It was found unnecessary to provide a positive mounting means for the seal assemblies, but such means, for example similar to the leaves 88 for the exchanger assembly, can be added if desirable.

Instead of using the above described sealing arrangement, an end assembly 120, preferable for certain purposes can be provided by way of the construction shown in Figs. 11 and 12. In this embodiment, the tube ends are contacted by semicircularly shaped plates 121 located between end walls 35, 36 and respective distributor assemblies. These plates 121 are pressed together by means of bolts 125, 126 the heads of which protrude into recesses of bottom plate 31, similar to those shown at 55, 56 (Fig. 3) for the bolts of distributor bottom block 63, and the heads of which extend through the cover plate 39 in the manner described above for the distributor assembly. These nuts, when tightened, provide a satisfactory end seal.

A particular advantage of the above described end seal assembly 120 is the smooth distribution of the fluid coming through channels 103, the saw cuts of discs 101. As indicated by arrows $b$ (Fig. 12) the fluid is guided around the entire distributor into the main portion of the exchange conduit so that stagnant pools are avoided, which is particularly important if the fluid is subject to clotting.

Instead of the distributor assembly described with reference to Figs. 9 and 10 other constructions are advantageous, depending upon circumstances, and several of such modifications will now be described.

The distributor according to Figs. 13 and 14 has a folded sheet 131 of suitable material with aperture 132 and cut off corners 133. A central sheet 135 with a keyhole shaped notch 136 fits within the fold 131, forming the assembly shown in Fig. 14. Fluid entering through apertures 132 of folded sheet 131 will pass through the cutout channel 136 of plate 135, as indicated by the arrows $c$ of Fig. 14, and fluid coming from the tube 92 will flow through 136 into 132. This exchange tube may be sealed as indicated either in Figs. 8 or 11. Fig. 14 shows a sealing assembly 120 of the type shown in Figs. 11 and 12 with rounded sealing plates 121. It will be noted that the channel 136 of the distributor faces the sealed end of the exchange conduit, thus flushing the end portion which might otherwise cause whirls or stagnancy.

Figs 15 and 16 show a third distributor embodiment which is quite similar to that of Figs. 13 and 14, with the difference that three separate plates 141, 142 and 143 are provided, with keyhole shaped cutout 145 and apertures 147 and 148 respectively. These plates are assembled as indicated in Fig. 16, which also shows a third possibility of sealing the exchange elements. In this instance the seal is provided by pressure plates 151, which are preferably assembled of laminations of the same thickness as the plates of the distributor, thus inherently providing proper spacing of the assembly as will be evident with reference to Fig. 11 where the pairs of sealing bars 121 between two conduit ends correspond to a pair of laminated plates 151 of Fig. 16. Fig. 16 shows the supply channel pointing towards the inside of the exchange elements, which construction may be preferable if rapid flow is desirable and coagulation is immaterial or impossible.

Figure 18:
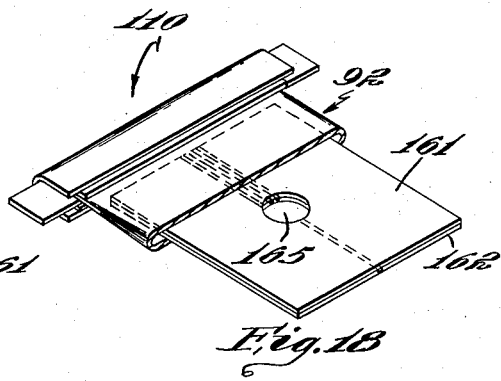

A fourth type of distributor is shown in Figs. 17 and 18. These distributors consist of two thin plates 161, 162 with apertures 165. One of the plates has grooves 167, 168 which provide fluid distribution towards both sides of the distributor assembly. In order to provide proper flushing of the exchange conduit ends, several recesses are preferably provided at the seal end of the distributor, as shown in Figs. 17 and 18. An increased number of recesses may be provided for the discharge end of the exchange element, while a distributor with a smaller number of recesses serves as a metering port for the supply end. Fig. 17 shows a discharge and Fig. 18 a supply distributor. It will be understood that distributors of this type can be made circular with radial channels, and combined with sealing assemblies according to Figs. 11, 12 and 14 instead of the clip seals according to Figs. 8 and 21, shown in Figs. 17 and 18.

Figure 19:
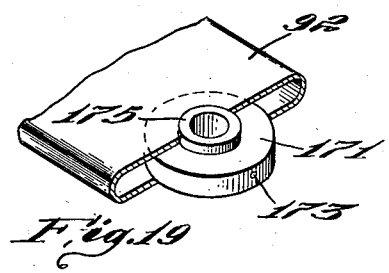
Fig. 19 is an axonometric detail view of a fifth distributor construction.
Figure 20:
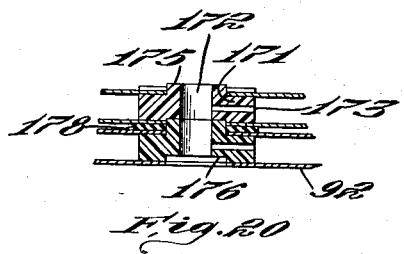
Fig. 20 is an axial section of the distributor construction according to Fig. 19.

Figs. 19 and 20 show still another distributor assembly, constructed as follows. This distributor comprises washers 171 with central apertures 172 and channels 173 drilled between periphery and the aperture. An annularly raised boss or hub portion 175 corresponding to a recess 176 centers the washers. A slightly yielding gasket 178, for example of rubber, is inserted between the walls of adjacent exchange elements 92 as shown in Fig 20. The washers 171 are preferably made of material such as Teflon which is not only very inert but also provides a good direct contact seal between the faces of adjacent washers. The rubber gaskets 178 are initially somewhat thicker than indicated in Fig. 20, so that upon pressure being applied to the distributor assembly, these rubber gaskets are slightly compressed, providing a perfect seal between the exchange element walls and the washers as well as permitting the direct contact seal between the faces of hub and recess.

As indicated above, the materials used for purposes of the present indention have to be selected in accordance with the intended use. The embodiment described with reference to Figs. 1 to 10 was built for purposes of determining the optimal flow rates of respective fluids for maximal dialyzing efficiency, trials on animals and human patients for regulation of blood chemistry and removal of diffusible waste products normally removed by the kidneys.

For this purpose it was found that cellophane was well suited for the exchange conduits 92, nylon for the distributor assembly 100, and "Plexiglas II" for the housing 30. The fluid supply tubes can be made of nylon or polychlorotrifluoroethylene ("Kel-F"), the sealing gasket if used can be made of silicone rubber covered glass cloth, as mentioned above, and the spacing equipment and the separator screens of stainless steel. Regarding practical dimensions of the more or less critical parts the more important ones of the embodiment shown are as follows, it being of course understood that they are mere examples and will vary widely according to requirements. Referring particularly to Fig. 8, the thickness dimensions along the aperture axes are:

|  | Inches |
|---|---|
| Washer 105 | .015 |
| Washer 101 | .015 |
| Washer 107 | .015 |
| Wall of tube 92 | .0008 |
| Wall of tube 92 | .0008 |
| Total | .0466 |

The corresponding dimensions of the exchanger assembly proper are:

|  | Inches |
|---|---|
| Inside clearance of tube 92 | .011 |
| Wall of tube 92 | .0008 |
| Separator screen 91 | .034 |
| Wall of tube 92 | .0008 |
| Total | .0466 |

Again referring to the above embodiment, apertures 102, 107, 108 of $\frac{5}{16}$" diameter and eight saw cuts 103, each .020" wide and $\frac{5}{16}$" long were found satisfactory. The effective length of the exchange unit is 46 cm. which, with 27 tubes, provides an effective exchange area of 10,000 cm.², with a tube content of about 250 cc., which can be moved through the exchanger within about 60 seconds depending on the pressure. It was found that this device will handle 1,000 cc./min. of blood at 200 cm. pressure.

Exchange devices of this type operate as follows.

Fluid is supplied to the exchange conduits 92 through tube 51 which is tightly fitted into the cover 39 and the distributor top plates 64 as shown in Fig. 3, and the fluid is discharged through tube 52 which is similarly assembled at the other end of the device. The fluid advances through the central aperture of the supply header or distributor assembly, branching as above described with reference to Figs. 8, 12, 14, 16, 18 and 20. At the discharge side the parallel branches from the exchange tubes join within the other distributor header and are discharged through tube 52.

The second exchange fluid is supplied through tube 45 or 46, and discharged through tube 46 or 45 respectively, in a manner needing no further explanation, it being apparent from Figs. 1 to 3 how these tubes lead into the inside of the container 30. It will be evident that one or both of the fluids may be gaseous or liquid, and that a vacuum may be maintained within the container, so long as the pressure within the exchange conduits is somewhat greater than the vacuum.

Dialytic or other exchange takes place through the walls of the tubes 92, and it will be understood that, as previously pointed out, the material of these elements as well as that of distributors and casing will be selected in accordance with the purpose at hand.

While apparatus with parallel connected exchanger conduits or tubes as above described has been found particularly advantageous, it is one of the advantages of my exchanger that this arrangement is not the only possible one, and that series as well as series-parallel flow can easily be accomplished with only slight changes of the components of the device. Also, arrangements with more than two headers and several sets of openings in the exchanger tubes may sometimes be preferable.

Figure 22:
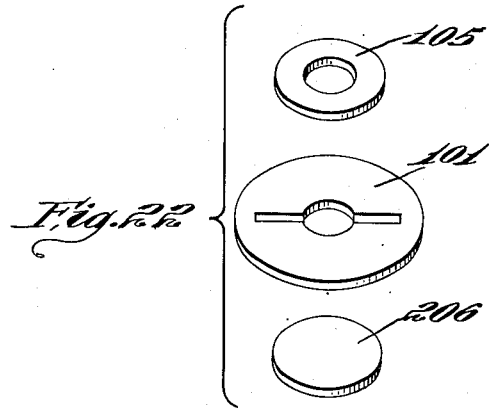
Fig. 22 is an axonometric view similar to that of Fig. 9, of a deviating distributor.

A convenient means of changing from parallel to series or series-parallel connection is derived from the distributor arrangement according to Figs. 8 to 12. This is shown in Fig. 22. In this figure, washers 101 and 105 are similar to those shown in Figs. 9 and 10 whereas washer 206 is a solid disc, with central aperture 107 or 108 omitted.

Figure 23:
Fig. 23 is a schematic cross section through a device according to my invention with series flow.

Referring now to Fig. 23, it will be evident that the exchanger conduits can be connected in series by using at the appropriate point, as indicated in that figure, solid discs 206 instead of apertured washers 106. With this in mind, Fig. 23 is believed to be self-explanatory.

Figure 24:
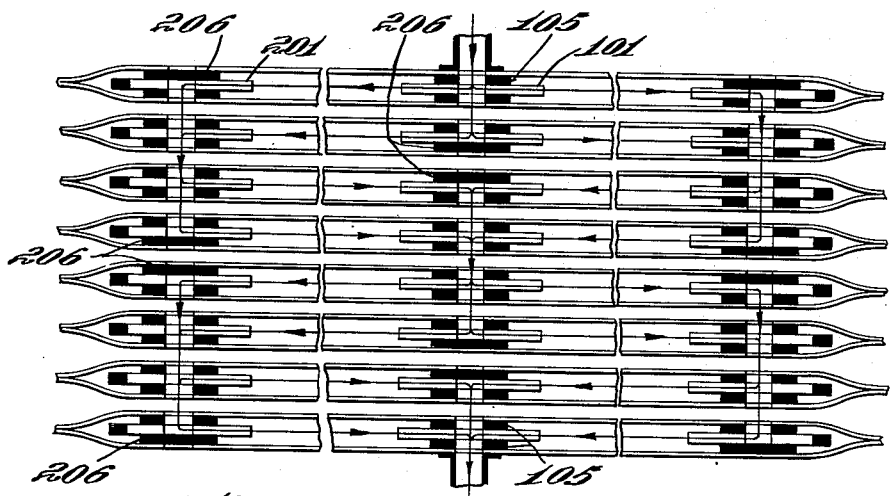
Fig. 24 is a section similar to Fig. 23 of an arrangement with three headers and series-parallel flow.
Figure 25:
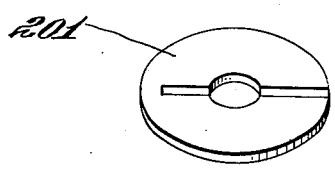
Fig. 25 shows a distributor center disk similar to that of Figs. 9 and 22.

Fig. 24 presents an example for series-parallel flow as well as multi-header arrangements. Again, distributor elements according to Fig. 22 are employed, with solid discs 206 used at the appropriate points for blocking the progress of fluid through the respective distributor aperture. If desired, disks 201 (Fig. 25) can be used instead of 101, the schematical showing of Figs. 23 and 24 assuming such disks for the sake of simplicity.

In dimensioning of the exchanger tube elements, it should be kept in mind that there is a definite limit below which the flattening of the tubes cannot be carried. This is due to frictional effects and also to the possibility that not all parts of the tube will then not be fully used because relatively complete exchange of the fluid might take place only in the part adjacent to the supply channel of the distributor unit, leaving little exchange during the remainder of the passage through the tube.

Also, if a tube is flattened too much, the friction becomes so great that the pressure needed to force the liquid through the tube is high enough to cause considerable change in the balance of the hydrostatic and osmotic pressures which should be maintained carefully across the membrane. In extreme cases the tube might even rupture. In general, the gradient of pressure from one end of the tube to the other should be small in order to minimize the pumping problem and to allow for accurate control of the hydrostatic pressure needed to balance the osmotic pressure of the fluid within the tubes.

It will be apparent that the design according to the present invention allows for large variations of thickness of the effective exchange membrane.

An aid in the selection of tube thickness, particularly when comparatively very thin walls are needed, are the spacers or internal supports 91 according to my arrangement. These supports should contact the tubing in such a way that a minimum of the tubing surface 92 is covered while the points of support are near enough to prevent significant bulging between these points. As mentioned, various materials are available for this element, which might take the shape of cloth, screening, grooved plates, grilles or other multiple-point structures, depending on the problem to be met.

In the above-described embodiment the exchanger tubes are allowed to open only as much as the thickness of the leaves 88 between the screen allows, compare Figs. 6, 7 and 8. This provides a large exchange area, with only a small amount of liquid required to fill the tubes, whereas even flow due to uniform tube wall distance is maintained. This is particularly important in the preferred embodiment using parallel or series-parallel flow; in purely series arrangements, the pressure usually has to be so high that thicker tubing and greater wall distances have to be employed.

The spacing leaves may have considerable width, up to about ¼", thus bridging many of the rounded supporting points of the screen and making it certain that the thickness of the fluid body within the tube is essentially equal to that thickness of the spacer leaf, thus permitting fairly precise dimensioning of the device, and adjustment by exchanging the side plates 85, 86 and leaves 88 in order to modify number or dimension of the exchange conduits.

Another important advantage of my device is the possibility of using a minimum amount of fluid such as washing fluid within the housing proper surrounding the exchange conduits. This is important because it may be desirable to keep the concentration of exchange solute in the washing solution as high as possible. Another reason is to economize on the use of heated or cold chambers from the point of view of space occupied by the device. Thus, the washing solution or generally speaking the solution surrounding the exchange tubes can be kept small within the machine and yet its total volume can be varied widely by the use of external reservoirs from and through which the fluid can be pumped. Another advantage of a low washing fluid volume is that it may be necessary to treat it by way of secondary steps. In order to apply the desired type of treatment of the fluid, which might then be called a primary fluid, it may be exchange treated with one or more secondary and even tertiary fluids.

Another advantage of small washing fluid volumes is that much greater flushing of the surface of the membrane is achieved at any given rate of flow. The thin fluid films inside as well as outside the tubes insure vigorous removal of surface films of fluid from the membrane. This gives very good clearance values as compared to test apparatus where the respective fluid film thickness is greater.

It should be understood that the present disclosure is for the purpose of illustration only and that this invention includes all modifications and equivalents which fall within the scope of the appended claims.

I claim:

1. In exchange apparatus for fluids, a conduit assembly which comprises: housing means; a tube of collapsibly inflatable material forming a conduit for a fluid and having at least one opening in its wall; a pair of spaced, essentially rigid tube shaping means extending longitudinally adjacent substantially the entire length of the tube and having peripheral portions secured to said housing means, said tube being located between said shaping means whereby upon application of fluid pressure said tube is inflated against the said rigid shaping means for defining the thickness of fluid within the tube which presses the tube wall against the shaping means to flatten the tube thereby to increase the surface area to volume ratio thereof, and to locate said opening in a flat wall portion; a header located at said wall portion for passing fluid, said header comprising a distributor extending within the tube and having an aperture aligned with said opening and a channel extending between said aperture and the inside of the tube; means for sealing the tube walls to said distributor; and means for connecting said aperture with a supply of said fluid.

2. Assembly according to claim 1 wherein said opening is near an end of said tube which extends with that end beyond said distributor where it is combined with means for closing the end.

3. Assembly according to claim 1 wherein said tube is sealed near said header with external sealing plates which compress the tube walls and are rounded concavely towards said header, providing together with the distributor a smooth channel for the fluid.

4. Apparatus according to claim 1 wherein said distributor includes three apertured washers stacked inside said tube with their apertures aligned with said tube wall aperture, the middle washer having a greater diameter than the other washers and having a cut radially extending from the aperture beyond the periphery of the other washers, thus forming a channel between the aperture and inside of the tube.

5. Apparatus according to claim 1 wherein said distributor includes three apertured leaves stacked inside said tube with their apertures aligned with said tube wall opening, the middle washer having a notch to form a channel between the aperture and the inside of the tube.

6. Apparatus according to claim 1 wherein said distributor includes a large washer having a central aperture and a groove extending outwardly therefrom, and a small apertured washer contacting the large washer, the apertures of the washers being in alignment, said groove forming a channel between the aperture and the inside of said tube.

7. In exchange apparatus for fluids the conduit assembly which comprises: housing means having inlet and outlet means for flow of one fluid, a plurality of tubes of collapsibly inflatable material forming conduits for a second fluid and having pairs of openings near their ends; a plurality of essentially rigid tube spacing and shaping means which extend alternatingly with and longitudinally adjacent substantially the entire length of the tubes and having peripheral portions secured to said housing means, each of said tubes being located between an adjacent pair of said shaping means whereby upon application of fluid pressure said tube is inflated against the said rigid shaping means for defining the thickness of the fluid within the tubes which presses the tube walls against the shaping means to flatten the tubes therebetween thereby to increase the surface area to volume ratio thereof, and to locate said openings coaxially aligned at each side; two headers located at the respective ends of the tubes for introducing and removing the second fluid, respectively, each header comprising for each tube a distributor extending inside the tube, having an aperture aligned with said openings and a channel extending between said aperture and the inside of the tube; means for sealing the tube wall portions adjacent said aperture to said distributors and to the walls of adjacent tubes; means for connecting said apertures with a supply of said fluid and means for sealing the tube ends.

8. Apparatus according to claim 7 wherein said header comprises a plurality of stacked washers with aligned apertures, each of the washers having a centrally located hub extending on one side and a recess in the other side thereof for engaging the hub of the adjacent washer, each of said tubes enclosing one of the washers and having aligned apertures in the walls thereof axially aligned with the washer apertures, the hub of the washer enclosed by the tube extending through one aperture and the hub of the adjacent washer engaging the recess of the washer extending through the other recess; and an annular ring of yieldable material surrounding each of the respective hubs and interposed between the walls of adjacent tubes for sealing the apertures therein, each of the washers having a channel therein extending between its aperture and the inside of the enclosing tube; and clamping means for restraining the washers with the apertures in sealed alignment.

9. Assembly according to claim 7, wherein said means for sealing the tube ends comprises bars transverse of said tubes at said ends between each pair of adjacent tubes, and means for compressing said bars.

10. Assembly according to claim 7 wherein said means for sealing the tube ends comprises a substantially rigid strip over which said ends are folded, and a U-shaped clip compressed over said ends and said strip.

11. Apparatus according to claim 7 wherein said collapsibly inflatable material is a semipermeable material for dialysis of said fluids.

12. Apparatus according to claim 11 wherein said semi-permeable material is cellophane.

References Cited in the file of this patent

UNITED STATES PATENTS

| Number | Name | Date |
|---|---|---|
| 668,558 | Fouche | Feb. 19, 1901 |
| 1,719,754 | Cerini | July 2, 1929 |
| 2,411,238 | Zender | Nov. 19, 1946 |
| 2,597,907 | Steiner et al. | May 27, 1952 |

FOREIGN PATENTS

| Number | Country | Date |
|---|---|---|
| 97,903 | Sweden | Jan. 30, 1940 |
| 827,989 | France | Feb. 2, 1938 |
| 883,006 | France | Mar. 15, 1943 |